US011554676B2

(12) United States Patent
Hanaoka et al.

(10) Patent No.: US 11,554,676 B2
(45) Date of Patent: Jan. 17, 2023

(54) MOTOR DEVICE (71) Applicant: SUBARU CORPORATION, Tokyo (JP)

(72) Inventors: Masatoshi Hanaoka, Tokyo (JP); Akihito Katsume, Tokyo (JP); Seiya Morimoto, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 261 days.

(21) Appl. No.: 16/843,652

(22) Filed: Apr. 8, 2020

(65) Prior Publication Data
US 2020/0406761 A1 Dec. 31, 2020

(30) Foreign Application Priority Data

Jun. 26, 2019 (JP) .............................. JP2019-118018

(51) Int. Cl.
| H02P 23/00 | (2016.01) |
| B60L 15/20 | (2006.01) |
| B60L 53/22 | (2019.01) |
| H02K 5/173 | (2006.01) |
| H02K 7/00 | (2006.01) |
| H02K 11/00 | (2016.01) |
| H02K 11/33 | (2016.01) |
(Continued)

(52) U.S. Cl.
CPC .............. B60L 15/20 (2013.01); B60L 53/22 (2019.02); H02K 5/1732 (2013.01); H02K 7/006 (2013.01); H02K 7/083 (2013.01); H02K 11/0094 (2013.01); H02K 11/33 (2016.01); H02K 21/16 (2013.01); H02P 23/009 (2013.01); B60L 2240/14 (2013.01); B60L 2240/42 (2013.01)

(58) Field of Classification Search
CPC ....... B01L 15/20; H02K 11/33; H02P 23/009; H02P 21/0089
USPC ...................................................... 318/400.21
See application file for complete search history.

(56) References Cited

U.S. PATENT DOCUMENTS

2017/0207673 A1*  7/2017  Kinjo ..................... H02K 1/146

FOREIGN PATENT DOCUMENTS

| CN | 102820755 A | * | 12/2012 | |
| JP | 2009136141 A | * | 6/2009 | ............ B60L 15/025 |
(Continued)

OTHER PUBLICATIONS

Machine translation JP2012231584A.*

Primary Examiner — Kawing Chan
(74) Attorney, Agent, or Firm — McDermott Will & Emery LLP (57) ABSTRACT A motor device for a vehicle includes a stator, a rotor, a bearing, an inverter, and a controller. The stator is attached into a housing and includes a concentrated winding coil. The rotor includes a permanent magnet. The bearing supports a rotating shaft of the rotor. The inverter controls an energization state of the concentrated winding coil. If a rotational speed of the rotor is greater than a threshold, the controller outputs a control signal to the inverter to execute field weakening control, and thereby makes a potential difference between the housing and the rotating shaft lower than a withstand voltage of the bearing. The control signal controls the energization state of the concentrated winding coil. The field weakening control generates magnetic flux of the concentrated winding coil in a direction of weakening magnetic flux of the permanent magnet.

10 Claims, 12 Drawing Sheets (51) Int. Cl.
*H02K 21/16* (2006.01)
*H02K 7/08* (2006.01)

(56) References Cited

FOREIGN PATENT DOCUMENTS

| | | | |
|---|---|---|---|
| JP | 4622593 | B2 | 2/2011 |
| JP | 2012231584 | A * | 11/2012 |
| JP | 5732309 | B2 | 6/2015 |
| JP | 2016-158318 | A | 9/2016 |

* cited by examiner

MOTOR DEVICE

CROSS-REFERENCE TO RELATED APPLICATIONS

The present application claims priority from Japanese Patent Application No. 2019-118018 filed on Jun. 26, 2019, the entire contents of which are hereby incorporated by reference.

BACKGROUND

The technology relates to a motor device to be installed in a vehicle.

A vehicle including an automobile is provided with an electric motor such as a travel motor or a power generation motor. Such electric motors include a stator that is accommodated in a housing and a rotor that is accommodated in the middle of the stator. To the housing may be attached a bearing that supports a rotating shaft of the rotor (for example, reference is made to Japanese Unexamined Patent Application Publication No. 2016-158318 and Japanese Patent Nos. 4622593 and 5732309).

SUMMARY

An aspect of the technology provides a motor device to be installed in a vehicle. The motor device includes a stator, a rotor, a bearing, an inverter, and a controller. The stator is attached into a housing and includes a concentrated winding coil. The rotor is accommodated in the middle of the stator and includes a permanent magnet. The bearing is attached to the housing and supports a rotating shaft of the rotor. The inverter is provided between the stator and a power storage unit and is configured to control an energization state of the concentrated winding coil. The controller is configured to, in a case where a rotational speed of the rotor is greater than a threshold, output a control signal to the inverter to execute field weakening control, and thereby to make a potential difference between the housing and the rotating shaft lower than a withstand voltage of the bearing. The control signal is configured to control the energization state of the concentrated winding coil. The field weakening control is configured to generate magnetic flux of the concentrated winding coil in a direction of weakening magnetic flux of the permanent magnet.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the technology.

DETAILED DESCRIPTION

In the following, some example embodiments of the technology are described with reference to the accompanying drawings. Note that the following description is directed to illustrative examples of the disclosure and not to be construed as limiting to the technology. In each of the drawings referred to in the following description, elements have different scales in order to illustrate the respective elements with sizes recognizable in the drawings. Therefore, factors including, without limitation, the number of each of the elements, the shape of each of the elements, a size of each of the elements, a ratio between the elements, and relative positional relationship between the elements are illustrative only and not to be construed as limiting to the technology. Further, elements in the following example embodiments which are not recited in a most-generic independent claim of the disclosure are optional and may be provided on an as-needed basis. Throughout the present specification and the drawings, elements having substantially the same function and configuration are denoted with the same numerals to avoid any redundant description.

[Vehicle Structure]

Figure 1:
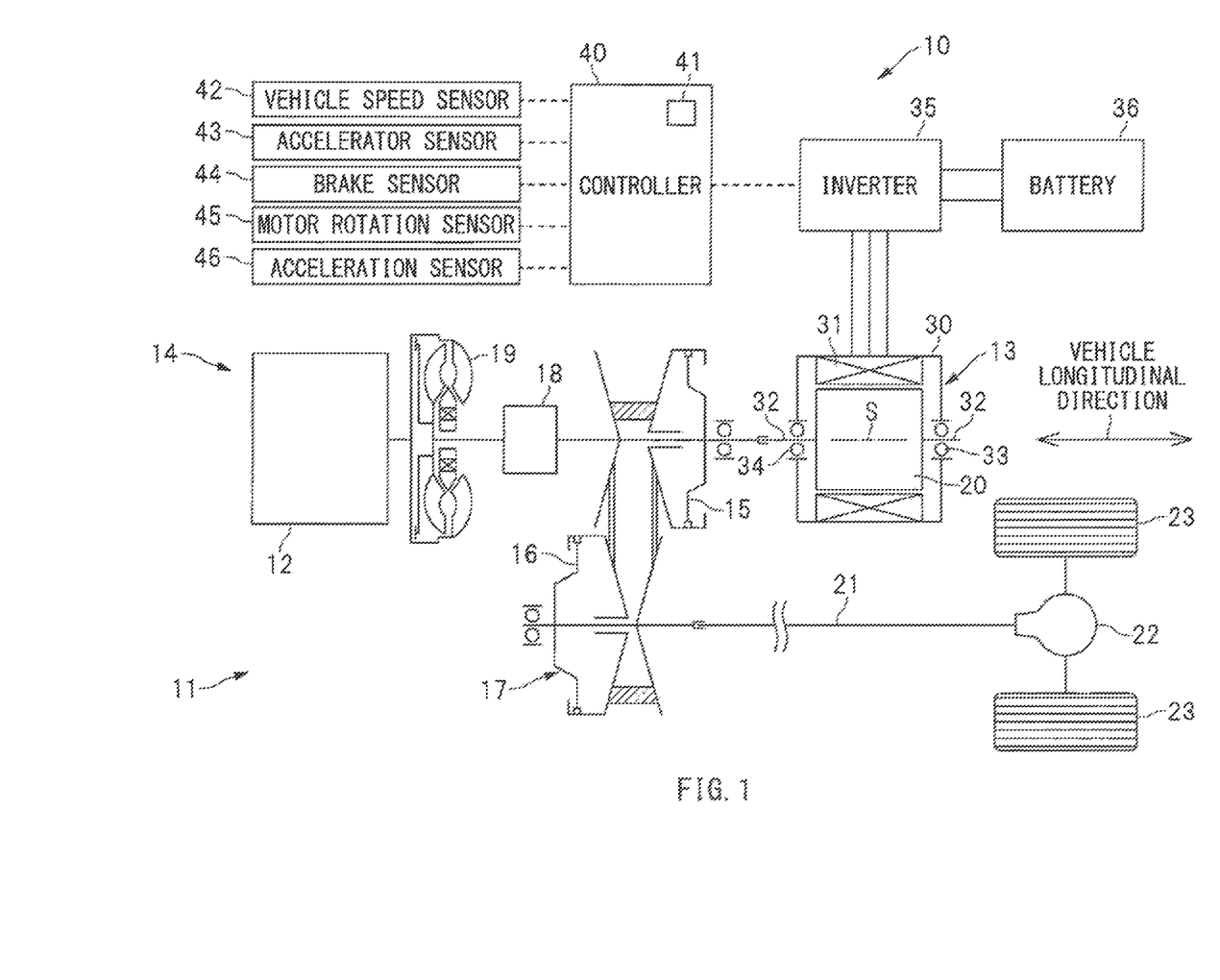
FIG. 1 is a schematic diagram illustrating a configuration example of a vehicle equipped with a motor device according to one example embodiment of the technology.

FIG. 1 is a schematic diagram illustrating a configuration example of a vehicle 11 equipped with a motor device 10 according to one example embodiment of the technology. The vehicle 11 illustrated in FIG. 1 may be a hybrid electric vehicle including, as power sources, an engine 12 and a motor generator 13, but this is a non-limiting example. The motor device 10 according to the example embodiment is also applicable to an electric vehicle not including the engine 12.

As illustrated in FIG. 1, a power train 14 to be installed in the vehicle 11 may be provided with the engine 12 and the motor generator 13. The power train 14 may also be provided with a continuously variable transmission 17 including a primary pulley 15 and a secondary pulley 16. The engine 12 may be coupled to one side of the primary pulley 15 via a forward/reverse switching mechanism 18 and a torque converter 19. A rotor 20 of the motor generator 13 may be coupled to the other side of the primary pulley 15.

To the secondary pulley 16, wheels 23 may be coupled via a wheel output shaft 21 and a differential mechanism 22, for example.

The motor generator 13 may be an electric motor provided in the motor device 10. The motor generator 13 includes a stator 31 that is accommodated in a motor housing 30, and the rotor 20 that is accommodated in the middle of the stator 31. In one embodiment, the motor housing 30 may serve as a "housing". A rotor shaft 32 serving as a rotating shaft of the rotor 20 may be supported rotatably by the motor housing 30 via bearings 33 and 34. Furthermore, to the stator 31 is coupled an inverter 35. To the inverter 35 is coupled a battery 36, such as a lithium ion battery. In one embodiment, the battery 36 may serve as a "power storage unit".

The inverter 35 may include a switching device and a capacitor, for example. The inverter 35 may be configured to convert electric power between direct current electric power and alternating current electric power. In controlling the motor generator 13 to a powering state, direct current electric power may be converted to alternating current electric power via the inverter 35, and electric power may be supplied from the battery 36 to the motor generator 13. In controlling the motor generator 13 to a regenerative state, alternating current electric power may be converted to direct current electric power via the inverter 35, and electric power may be supplied from the motor generator 13 to the battery 36.

To control the motor generator 13, the motor device 10 may include a controller 40 that is an electronic control unit including a microcomputer, for example. To control an energization state of a concentrated winding coil 52 to be described later, the controller 40 may also be provided with an energization control unit 41 that outputs a control signal to the inverter 35. Furthermore, to the controller 40 may be coupled a vehicle speed sensor 42, an accelerator sensor 43, a brake sensor 44, a motor rotation sensor 45, and an acceleration sensor 46, for example. The vehicle speed sensor 42 may detect a vehicle speed that is a traveling speed of the vehicle 11. The accelerator sensor 43 may detect an operation state of an accelerator pedal. The brake sensor 44 may detect an operation state of a brake pedal. The motor rotation sensor 45 may detect a motor speed Nm that is a rotational speed of the rotor 20. The acceleration sensor 46 may detect an acceleration acting in a longitudinal direction of the vehicle 11.

[Motor Generator Structure]

Figure 2:
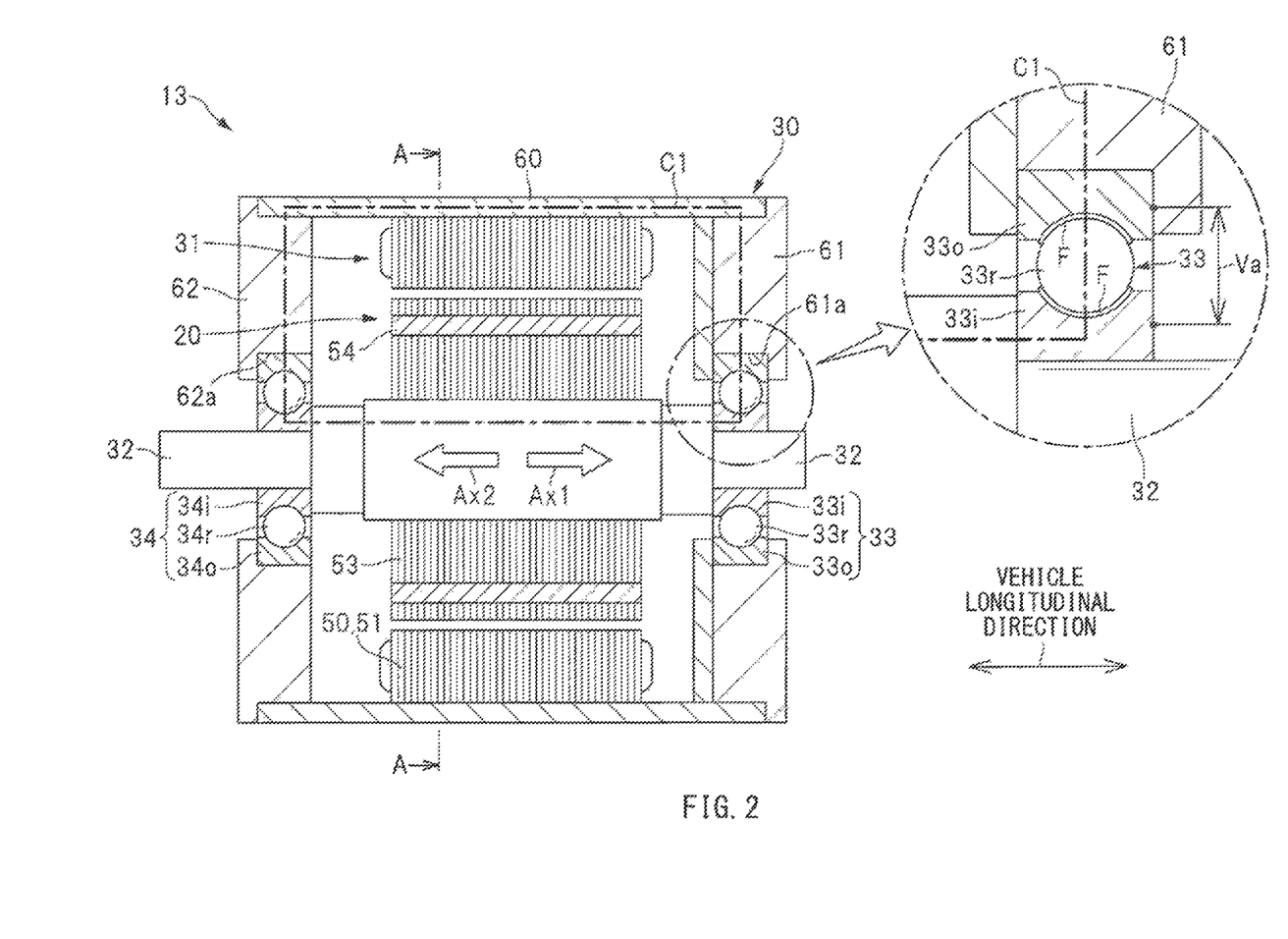
FIG. 2 is a cross-sectional diagram taken along a rotor shaft of a motor generator.
Figure 3:
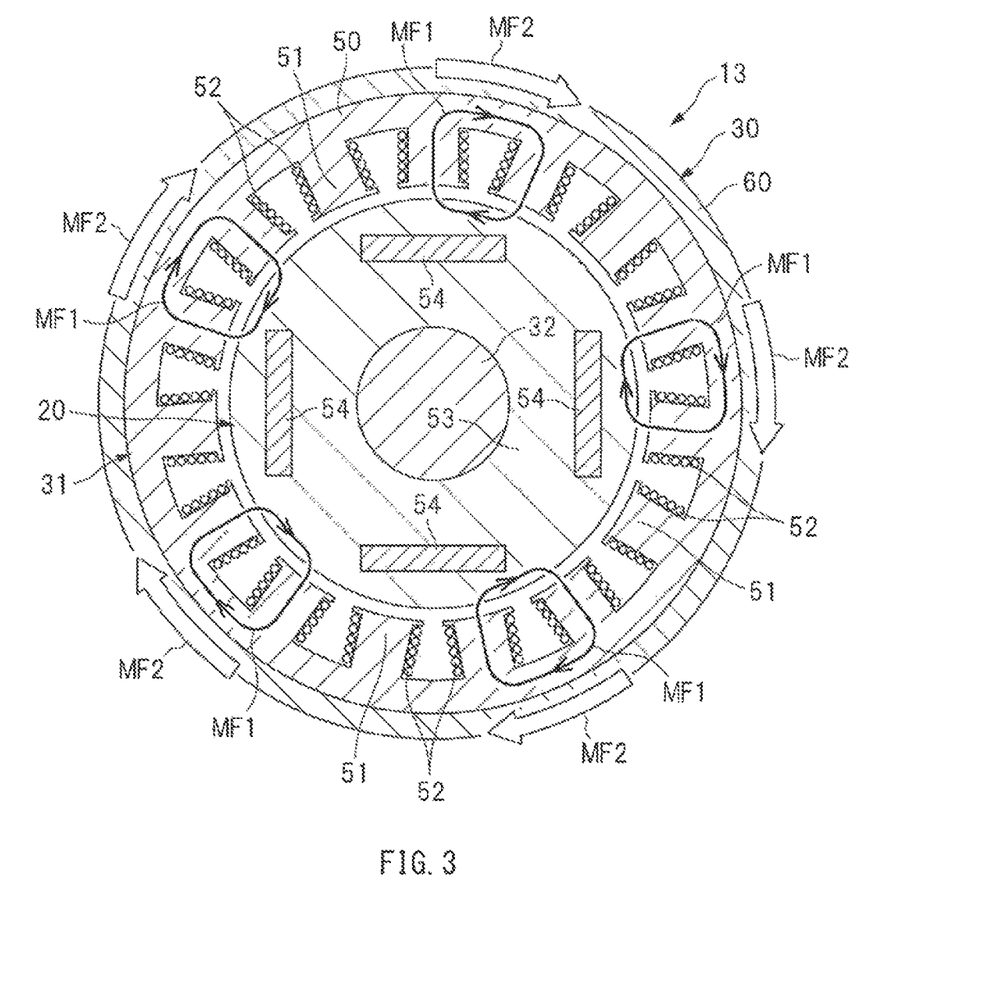
FIG. 3 is a cross-sectional diagram taken along line A-A in FIG. 2.

Now, a structure of the motor generator 13 will be described. FIG. 2 is a cross-sectional diagram taken along the rotor shaft 32 of the motor generator 13. FIG. 3 is a cross-sectional diagram taken along line A-A in FIG. 2. As illustrated in FIG. 2 and FIG. 3, the stator 31 attached into the motor housing 30 may include a substantially cylindrical stator core 50, and the concentrated winding coil 52 that is wound around individual teeth 51 of the stator core 50. The stator core 50 may include stacked silicon steel plates, for example. The rotor 20 accommodated in the middle of the stator 31 may include a substantially cylindrical rotor core 53, a plurality of permanent magnets 54 embedded in the rotor core 53, and the rotor shaft 32 inserted in the middle of the rotor core 53. The rotor core 53 may include stacked silicon steel plates, for example.

The motor housing 30 configuring a casing of the motor generator 13 may include a substantially cylindrical housing body 60 that holds the stator 31, a substantially disk-shaped end plate 61 that closes one end of the housing body 60, and a substantially disk-shaped end plate 62 that closes the other end of the housing body 60. The bearing 33 that supports one end of the rotor shaft 32 rotatably may be attached to an opening 61a provided in the middle of the one end plate 61. The bearing 34 that supports the other end of the rotor shaft 32 rotatably may be attached to an opening 62a provided in the middle of the other end plate 62.

The bearings 33 and 34 that support the rotor shaft 32 may respectively include outer races 33o and 34o attached to the end plates 61 and 62, inner races 33i and 34i attached to the rotor shaft 32, and rolling elements 33r and 34r provided between the outer races 33o and 34o and the inner races 33i and 34i. The outer races 33o and 34o, the inner races 33i and 34i, and the rolling elements 33r and 34r may each include a metal material having electrical conductivity. It is to be noted that the motor generator 13 illustrated may be a 4-pole 15-slot motor generator, but this is a non-limiting example. The motor generator 13 may have any other number of poles, and may have any other number of slots.

[Electrolytic Corrosion of Bearing]

Now, electrolytic corrosion of the bearings 33 and 34 will be described. When the energization state of the concentrated winding coil 52 is controlled to drive the motor generator 13, magnetic flux that passes through the adjacent teeth 51 sequentially occurs, as indicated by an arrow MF1 in FIG. 3. Thus, magnetic flux variation in a circumferential direction presumably occurs in the stator 31, as indicated by an arrow MF2. In a case where such magnetic flux variation in the circumferential direction occurs, a potential difference Va (hereinafter referred to as a shaft voltage Va) occurs between the stator 31 and the rotor 20 in a direction of canceling out the magnetic flux variation. This can cause electrolytic corrosion in the bearings 33 and 34 depending on a magnitude of the shaft voltage Va.

Here, the outer races 33o and 34o may be coupled to the stator 31 via the motor housing 30, and the inner races 33i and 34i may be coupled to the rotor 20 via the rotor shaft 32. Therefore, the shaft voltages Va occur between the outer race 33o and the inner race 33i of the bearing 33 and between the outer race 34o and the inner race 34i of the bearing 34, as illustrated in enlarged portion of FIG. 2. If the shaft voltages Va between the outer race 33o and the inner race 33i and between the outer race 34o and the inner race 34i exceed a withstand voltage Vb of the bearings 33 and 34 (hereinafter referred to as a bearing withstand voltage Vb), a current flows along a path C1 indicated by a dashed and single-dotted line, as illustrated in FIG. 2. Consequently, spark at the time of energization, for example, can cause electrolytic corrosion in the bearings 33 and 34.

The bearing withstand voltage Vb refers to a breakdown voltage of a lubricant film F that is formed in the bearings 33 and 34. As illustrated in the enlarged portion of FIG. 2, the lubricant films F that serve as insulating films may be formed between the outer race 33o and the rolling element 33r, between the outer race 34o and the rolling element 34r, between the inner race 33i and the rolling element 33r, and between the inner race 34i and the rolling element 34r. In other words, a situation in which the shaft voltage Va exceeds the bearing withstand voltage Vb indicates a situation in which breakdown of the lubricant film F interrupts an insulated state of the bearings 33 and 34, i.e., a situation in which spark at the time of energization, for example, can cause electrolytic corrosion in the bearings 33 and 34.

[First Bearing Protection Control]

Figure 4:
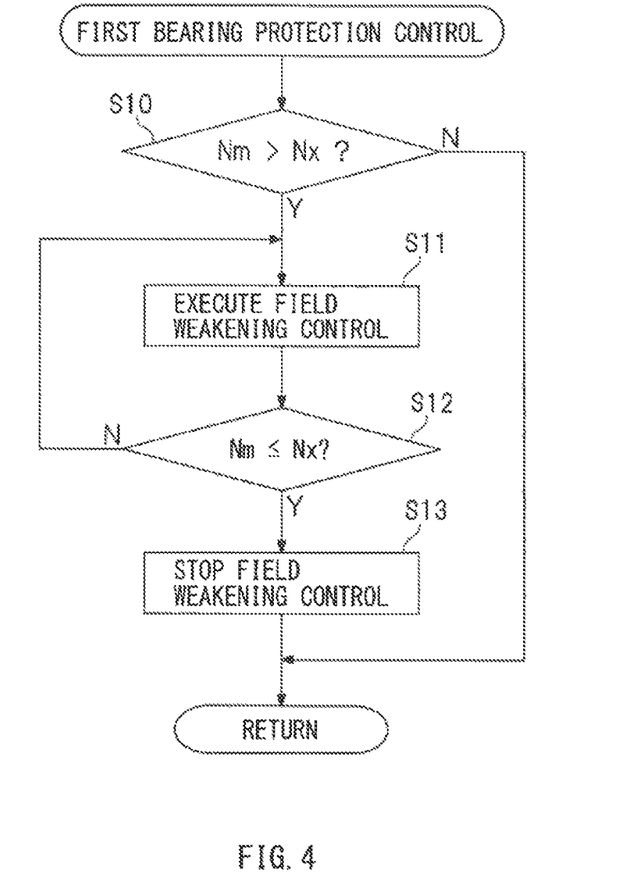
FIG. 4 is a flowchart illustrating an example of an execution procedure of first bearing protection control performed by an energization control unit of a controller.
Figure 5:
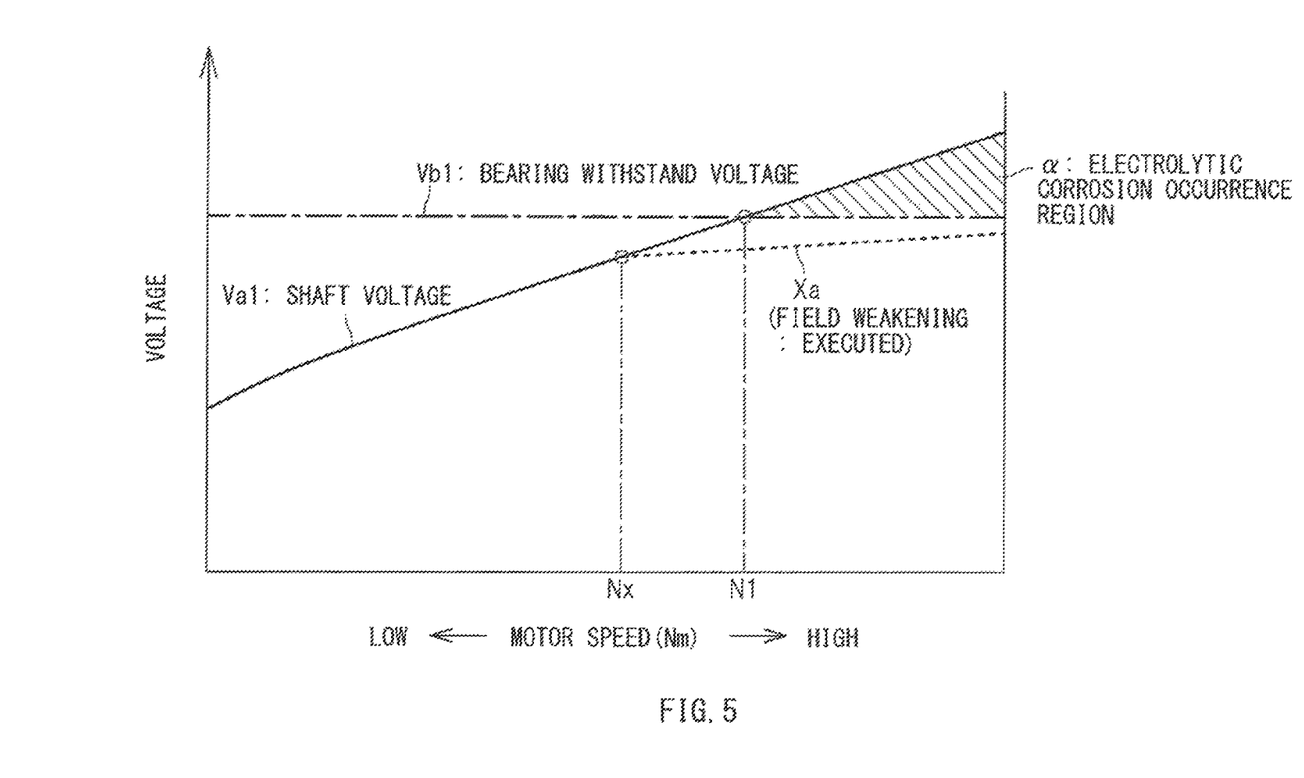
FIG. 5 is a diagram illustrating a relationship of a shaft voltage and a bearing withstand voltage with respect to a motor speed.
Figure 6:
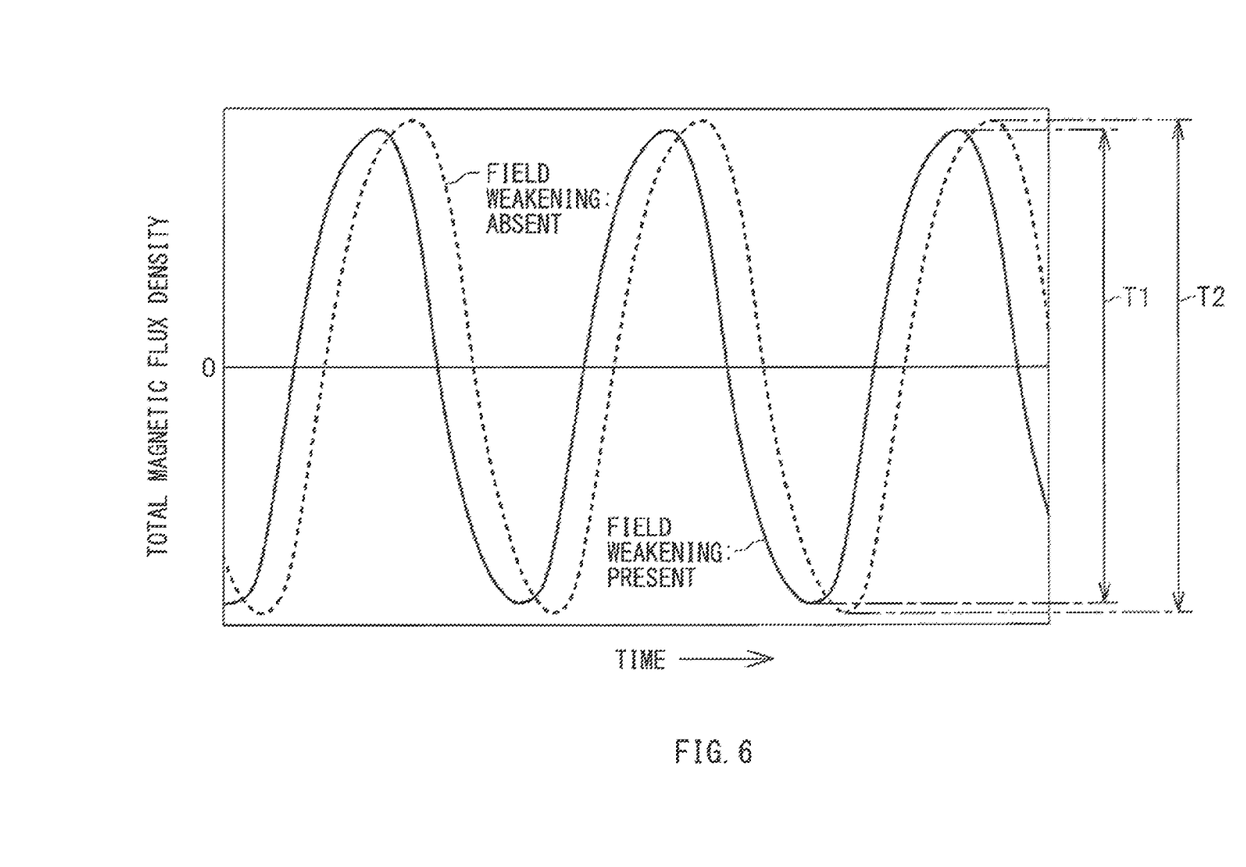
FIG. 6 is a diagram illustrating a change in magnetic flux density in a motor circumferential direction depending on presence or absence of field weakening control.

As described above, if magnetic flux variation in the circumferential direction occurs in the stator 31, and the shaft voltage Va exceeds the bearing withstand voltage Vb, electrolytic corrosion can occur in the bearings 33 and 34. Accordingly, the motor device 10 according to the example embodiment may execute first bearing protection control of protecting the bearings 33 and 34 from electrolytic corrosion, thereby preventing the shaft voltage Va from exceeding the bearing withstand voltage Vb. FIG. 4 is a flowchart illustrating an example of an execution procedure of the first bearing protection control performed by the energization control unit 41 of the controller 40. FIG. 5 is a diagram illustrating a relationship of a shaft voltage Va1 and a bearing withstand voltage Vb1 with respect to the motor speed Nm. FIG. 6 is a diagram illustrating a change in magnetic flux density in a motor circumferential direction depending on presence or absence of field weakening control. It is to be noted that the shaft voltage Va1 illustrated in FIG. 5 is an example of the shaft voltage Va described above, and the bearing withstand voltage Vb1 illustrated in FIG. 5 is an example of the bearing withstand voltage Vb described above.

As illustrated in FIG. 4, in step S10, the energization control unit 41 of the controller 40 may determine whether the motor speed Nm is greater than a predetermined threshold Nx. If the motor speed Nm is determined to be greater than the threshold Nx in step S10 (step S10: Y), the energization control unit 41 may cause the process to proceed to step S11, and execute field weakening control for the motor generator 13. If the motor speed Nm is determined not to be greater than the threshold Nx in step S10 (step S10: N), the energization control unit 41 may repeat the first bearing protection control from step S10 again. Here, the field weakening control refers to control of generating magnetic flux of the concentrated winding coil 52 provided in the stator 31 in a direction of weakening magnetic flux of the permanent magnet 54 provided in the rotor 20. This control may be achieved by the energization control unit 41 outputting, to the inverter 35, a control signal to control the energization state of the concentrated winding coil 52. In the field weakening control, causing negative d-axis current to flow through the concentrated winding coil 52 makes it possible to weaken the magnetic flux of the permanent magnet 54. The field weakening control may also be referred to as advance control, in view of the control that advances a phase of current of the concentrated winding coil 52.

Upon executing the field weakening control for the motor generator 13 in step S11, the energization control unit 41 may cause the process to proceed to step S12, and determine whether the motor speed Nm is equal to or less than the threshold Nx. If the motor speed Nm is determined to be greater than the threshold Nx in step S12 (step S12: N), the energization control unit 41 may cause the process to return to step S11, and continue the field weakening control for the motor generator 13. If the motor speed Nm is determined to be equal to or less than the threshold Nx in step S12 (step S12: Y), the energization control unit 41 may cause the process to proceed to step S13, and stop the field weakening control for the motor generator 13. Thereafter, the energization control unit 41 may repeat the first bearing protection control from step S10 again. In this manner, in the first bearing protection control, the field weakening control for the motor generator 13 may be executed in a region where the motor speed Nm is greater than the threshold Nx.

Here, as the motor speed Nm increases, induced voltage increases, which causes the shaft voltage Va1 to increase, as illustrated in FIG. 5. Therefore, in the example illustrated in FIG. 5, if the motor speed Nm exceeds a predetermined value N1, the shaft voltage Va1 enters an electrolytic corrosion occurrence region α above the bearing withstand voltage Vb1, which can cause electrolytic corrosion in the bearings 33 and 34.

Hence, in the above-described first bearing protection control, the field weakening control for the motor generator 13 may be executed in a case where the motor speed Nm is greater than the threshold Nx on a lower speed side than the predetermined value N1. As illustrated in FIG. 6, in a case where the field weakening control is executed, it is possible to reduce magnetic flux density in the motor circumferential direction from "T2" to "T1", as compared with a case where the field weakening control is not executed. In other words, executing the field weakening control makes it possible to reduce the magnetic flux density and suppress an increase in the induced voltage, making it possible to suppress an increase in the shaft voltage Va1.

As indicated by a dashed line Xa in FIG. 5, executing the field weakening control in a case where the motor speed Nm is greater than the threshold Nx makes it possible to suppress an increase in the shaft voltage Va1 to prevent the shaft voltage Va1 from exceeding the bearing withstand voltage Vb1. In other words, it is possible to make the shaft voltage Va1 lower than the bearing withstand voltage Vb1, making it possible to prevent occurrence of electrolytic corrosion in the bearings 33 and 34. This helps to appropriately protect the bearings 33 and 34 and enhance durability of the motor generator 13.

[Second Bearing Protection Control]

Figure 7:
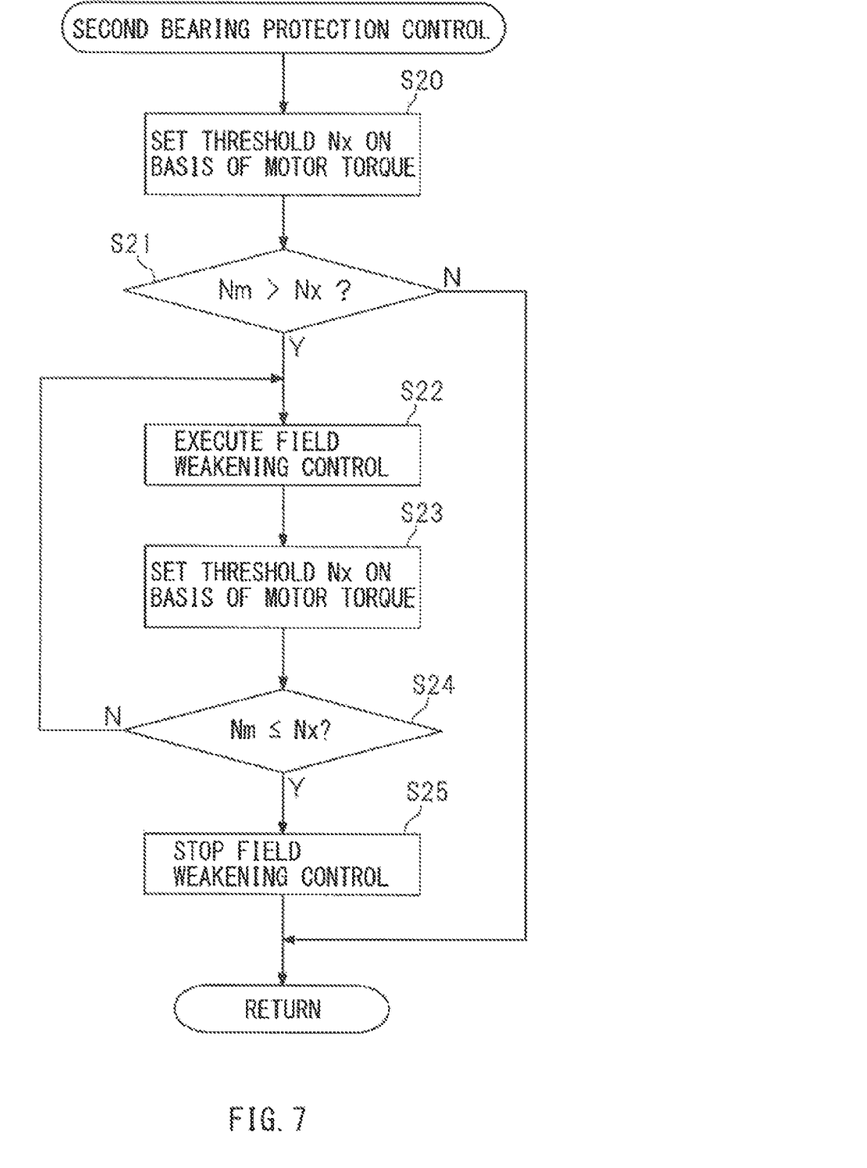
FIG. 7 is a flowchart illustrating an example of an execution procedure of second bearing protection control performed by the energization control unit of the controller.
Figure 8A:
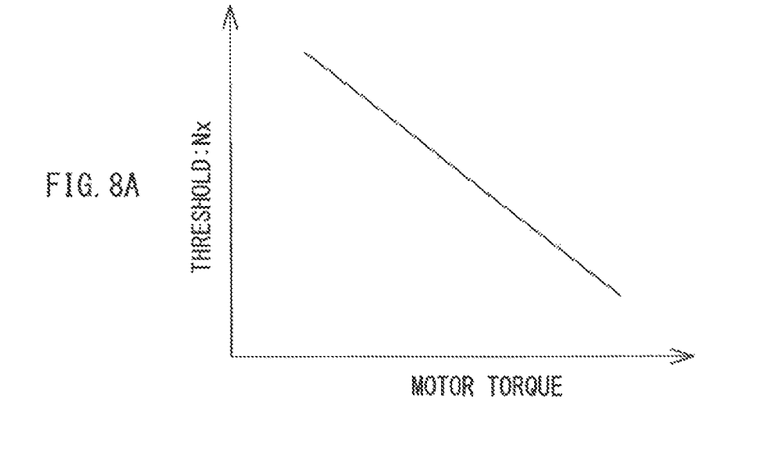
FIGS. 8A and 8B are diagrams each illustrating an example of a relationship between motor torque and a threshold.
Figure 8B:
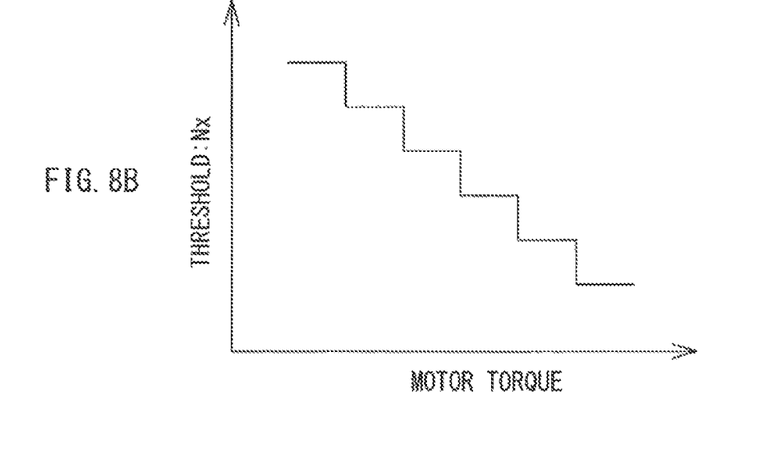
Figure 9:
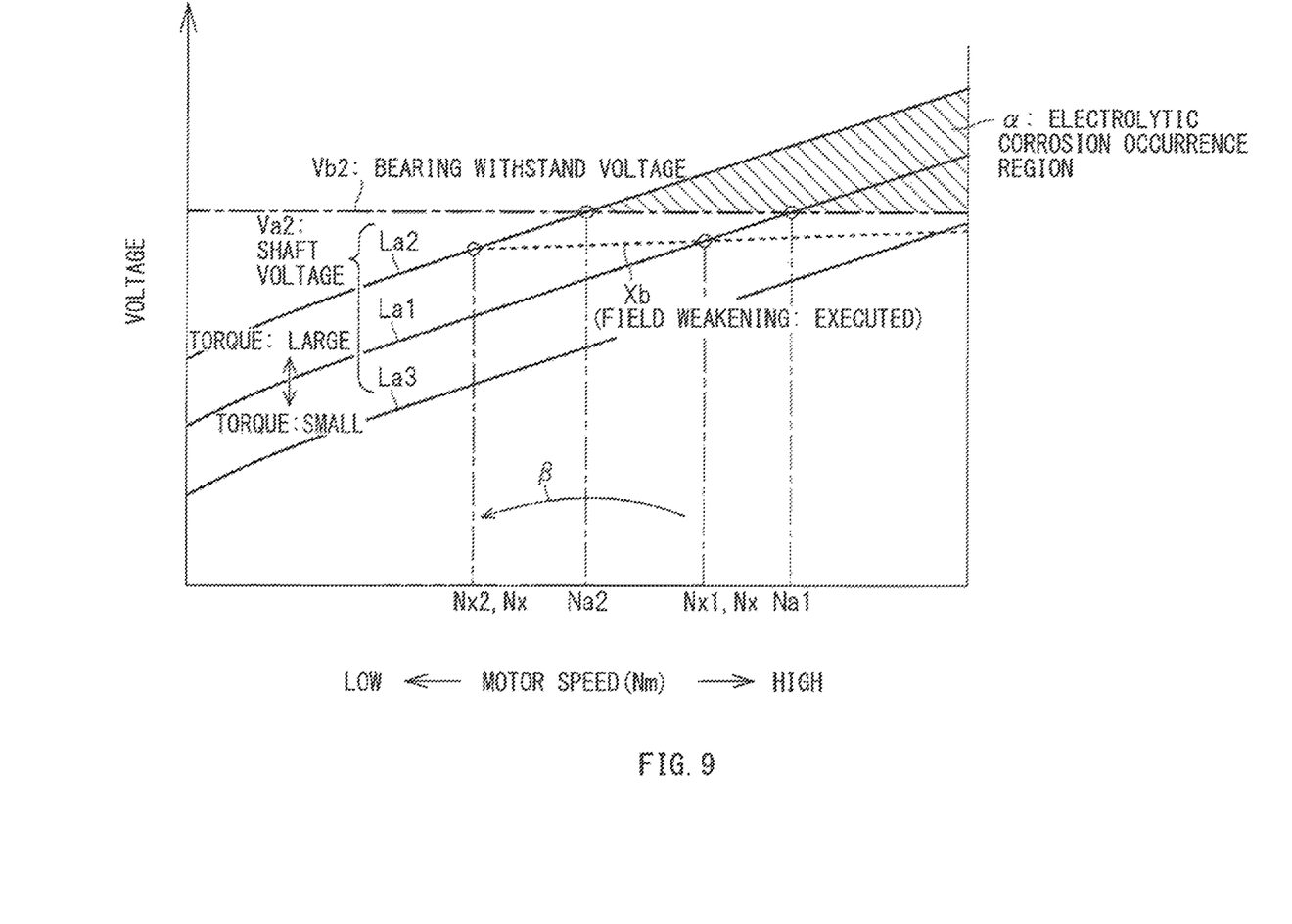
FIG. 9 is a diagram illustrating a relationship of a shaft voltage and a bearing withstand voltage with respect to a motor speed.

Now, another example of bearing protection control will be described. In the above-described first bearing protection control, the preset threshold Nx may be used as the threshold to be compared with the motor speed Nm for determination, but this is a non-limiting example. The threshold Nx may be increased or decreased on the basis of the motor generator 13. FIG. 7 is a flowchart illustrating an example of an execution procedure of the second bearing protection control performed by the energization control unit 41 of the controller 40. FIGS. 8A and 8B are diagrams each illustrating an example of a relationship between motor torque and the threshold Nx. FIG. 9 is a diagram illustrating a relationship of a shaft voltage Va2 and a bearing withstand voltage Vb2 with respect to the motor speed Nm. It is to be noted that the shaft voltage Va2 illustrated in FIG. 9 is an example of the shaft voltage Va described above, and the bearing withstand voltage Vb2 illustrated in FIG. 9 is an example of the bearing withstand voltage Vb described above.

As illustrated in FIG. 7, in step S20, the energization control unit 41 of the controller 40 may set the threshold Nx on the basis of motor torque that is output torque of the motor generator 13. As illustrated in FIG. 8A, the energization control unit 41 may set the threshold Nx lower as the motor torque increases. It is to be noted that the energization control unit 41 may change the threshold Nx in a continuous manner depending on the motor torque, as illustrated in FIG. 8A, or may change the threshold Nx in a stepwise manner depending on the motor torque, as illustrated in FIG. 8B. Upon setting the threshold Nx on the basis of the motor torque in this manner, the energization control unit 41 may cause the process to proceed to step S21, and determine whether the motor speed Nm is greater than the threshold Nx, as illustrated in FIG. 7. If the motor speed Nm is determined to be greater than the threshold Nx in step S21 (step S21: Y), the energization control unit 41 may cause the process to proceed to step S22, and execute field weakening control for the motor generator 13. If the motor speed Nm is determined not to be greater than the threshold Nx in step S21 (step S21: N), the energization control unit 41 may repeat the second bearing protection control from step S20 again.

Upon executing the field weakening control for the motor generator 13 in step S22, the energization control unit 41 may cause the process to proceed to step S23, and set the threshold Nx again on the basis of the motor torque. Thereafter, the energization control unit 41 may cause the process to proceed to step S24, and determine whether the motor speed Nm is equal to or less than the threshold Nx. If the motor speed Nm is determined to be greater than the threshold Nx in step S24 (step S24: N), the energization control unit 41 may cause the process to return to step S22, and continue the field weakening control for the motor generator 13. If the motor speed Nm is determined to be equal to or less than the threshold Nx in step S24 (step S24: Y), the energization control unit 41 may cause the process to proceed to step S25, and stop the field weakening control for the motor generator 13. Thereafter, the energization control unit 41 may repeat the second bearing protection control from step S20 again. In this manner, in the second bearing protection control, the threshold Nx may be set on the basis of the motor torque, and the field weakening control may be executed in a region where the motor speed Nm is greater than the threshold Nx.

Here, as the motor speed Nm increases, induced voltage increases, which causes the shaft voltage Va2 to increase, as indicated by characteristic lines La1 to La3 in FIG. 9. Even at the same motor speed Nm, the induced voltage increases and the shaft voltage increases in a case where flowing current is to be increased to increase the motor torque, whereas the induced voltage decreases and the shaft voltage decreases in a case where flowing current is to be reduced to reduce the motor torque. In other words, with reference to a situation in which the shaft voltage Va2 increases or decreases along the characteristic line La1, the shaft voltage Va2 increases or decreases along the characteristic line La2 in a case where the motor torque is increased, whereas the shaft voltage Va2 increases or decreases along the characteristic line La3 in a case where the motor torque is reduced.

Therefore, in the example illustrated in FIG. 9, in a situation in which the shaft voltage Va2 increases or decreases along the characteristic line La1, if the motor speed Nm exceeds a predetermined value Na1, the shaft voltage Va2 enters the electrolytic corrosion occurrence region α above the bearing withstand voltage Vb2, which can cause electrolytic corrosion in the bearings 33 and 34. In a situation in which the shaft voltage Va2 increases or decreases along the characteristic line La2, if the motor speed Nm exceeds a predetermined value Na2 on a lower speed side than "Na1", the shaft voltage Va2 enters the electrolytic corrosion occurrence region α above the bearing withstand voltage Vb2, which can cause electrolytic corrosion in the bearings 33 and 34. In other words, in a case where the motor torque increases, the shaft voltage enters the electrolytic corrosion occurrence region α at a lower motor speed Nm than in a case where the motor torque decreases.

Hence, in the above-described second bearing protection control, the threshold Nx may be set lower as the motor torque increases. In other words, in a case where the motor torque increases, the threshold Nx may be set to be reduced from "Nx1" to "Nx2", as indicated by an arrow β in FIG. 9. Thus, in a case where the motor torque increases, it is possible to execute the field weakening control at earlier timing. This makes it possible to suppress an increase in the shaft voltage Va2 to prevent the shaft voltage Va2 from exceeding the bearing withstand voltage Vb2, as indicated by a dashed line Xb in FIG. 9. In other words, it is possible to make the shaft voltage Va2 lower than the bearing withstand voltage Vb2, making it possible to prevent occurrence of electrolytic corrosion in the bearings 33 and 34. This helps to appropriately protect the bearings 33 and 34 and enhance durability of the motor generator 13.

It is to be noted that the motor torque to be used to set the threshold Nx may be target torque of the motor generator 13 that is set on the basis of the vehicle speed or an accelerator position, or may be output torque of the motor generator 13 that is estimated from current flowing through the concentrated winding coil 52.

[Third Bearing Protection Control]

Figure 10:
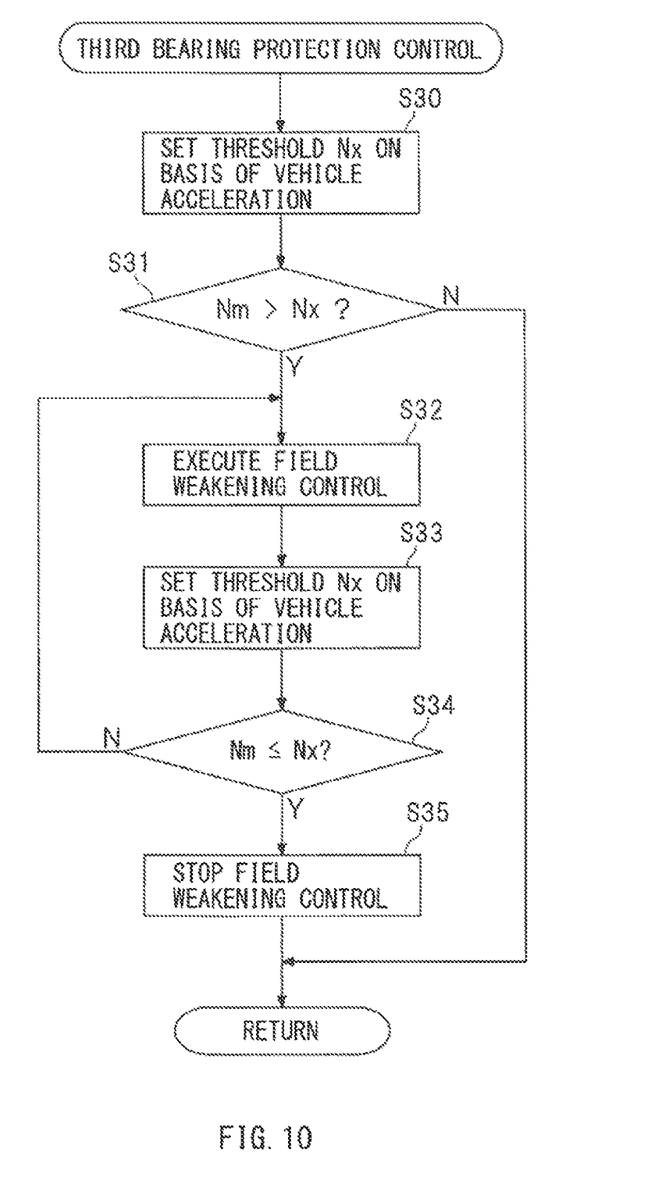
FIG. 10 is a flowchart illustrating an example of an execution procedure of third bearing protection control performed by the energization control unit of the controller.
Figure 11A:
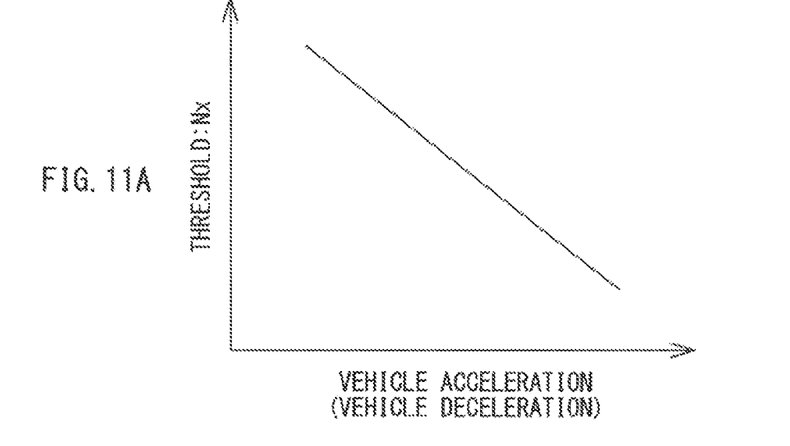
FIGS. 11A and 11B are diagrams each illustrating an example of a relationship between vehicle acceleration and a threshold.
Figure 11B:
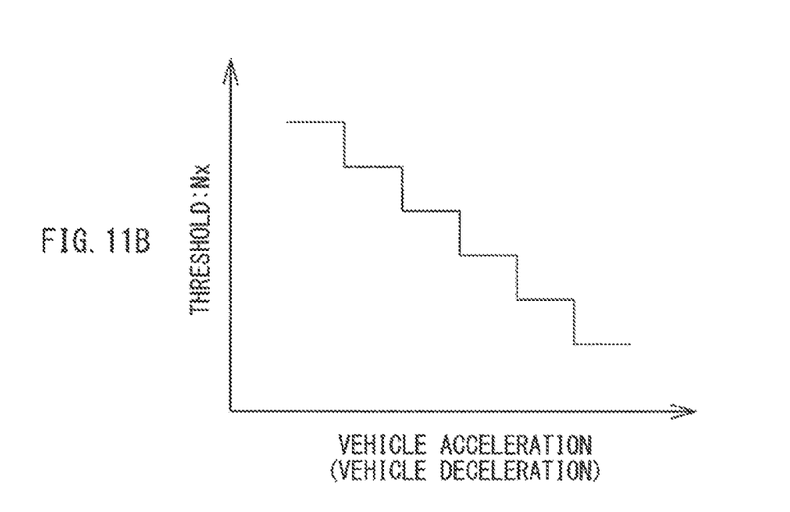
Figure 12:
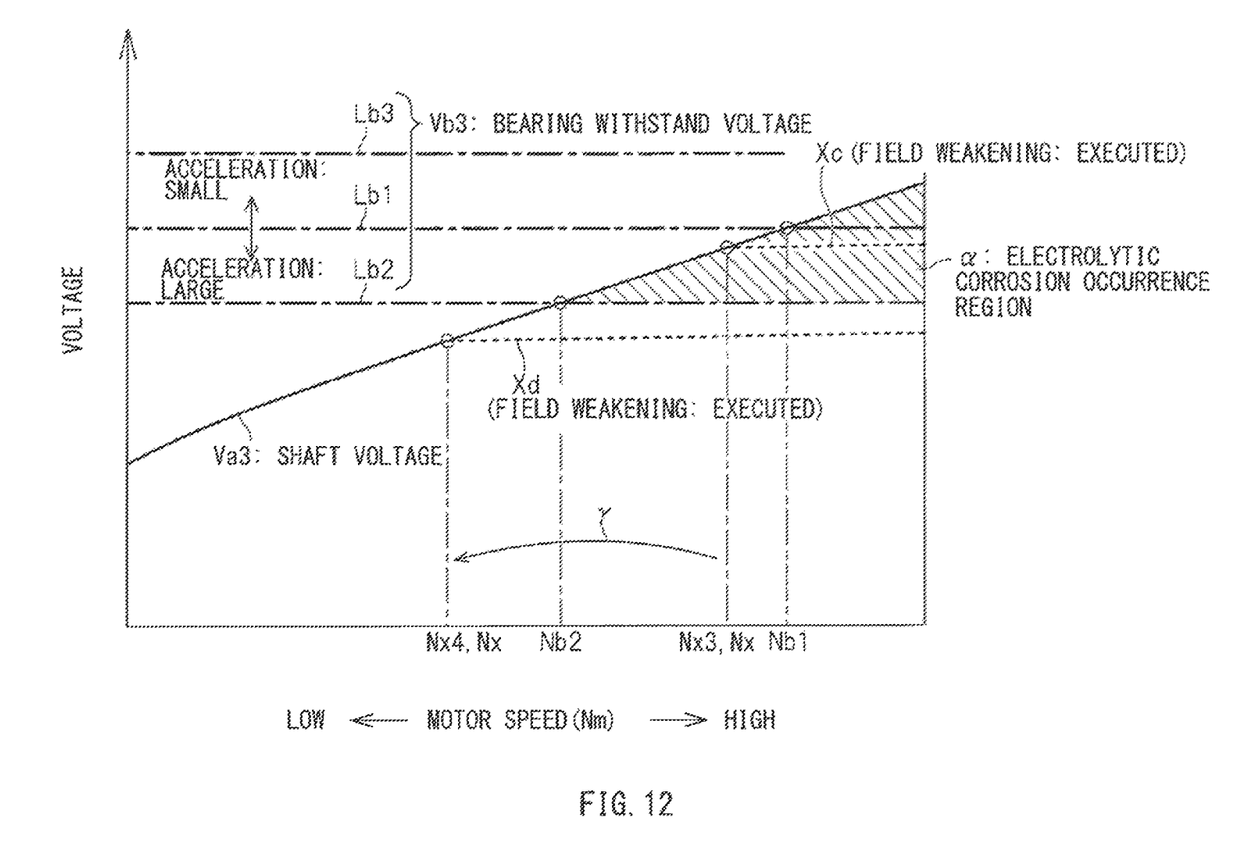
FIG. 12 is a diagram illustrating a relationship of a shaft voltage and a bearing withstand voltage with respect to a motor speed.

Now, another example of bearing protection control will be described. In the above-described first bearing protection control, the preset threshold Nx may be used as the threshold to be compared with the motor speed Nm for determination, but this is a non-limiting example. The threshold Nx may be increased or decreased on the basis of vehicle acceleration. FIG. 10 is a flowchart illustrating an example of an execution procedure of the third bearing protection control performed by the energization control unit 41 of the controller 40. FIGS. 11A and 11B are diagrams each illustrating an example of a relationship between vehicle acceleration and the threshold Nx. FIG. 12 is a diagram illustrating a relationship of a shaft voltage Va3 and a bearing withstand voltage Vb3 with respect to the motor speed Nm. It is to be noted that the shaft voltage Va3 illustrated in FIG. 12 is an example of the shaft voltage Va described above, and the bearing withstand voltage Vb3 illustrated in FIG. 12 is an example of the bearing withstand voltage Vb described above.

As illustrated in FIG. 10, in step S30, the energization control unit 41 of the controller 40 may set the threshold Nx on the basis of vehicle acceleration that acts when the vehicle is accelerated. As illustrated in FIG. 11A, the energization control unit 41 may set the threshold Nx lower as the vehicle acceleration increases. It is to be noted that the energization control unit 41 may change the threshold Nx in a continuous manner depending on the vehicle acceleration, as illustrated in FIG. 11A, or may change the threshold Nx in a stepwise manner depending on the vehicle acceleration, as illustrated in FIG. 11B. Upon setting the threshold Nx on the basis of the vehicle acceleration in this manner, the energization control unit 41 may cause the process to proceed to step S31, and determine whether the motor speed Nm is greater than the threshold Nx, as illustrated in FIG. 10. If the motor speed Nm is determined to be greater than the threshold Nx in step S31 (step S31: Y), the energization control unit 41 may cause the process to proceed to step S32, and execute field weakening control for the motor generator 13. If the motor speed Nm is determined not to be greater than the threshold Nx in step S31 (step S31: N), the energization control unit 41 may repeat the third bearing protection control from step S30 again.

Upon executing the field weakening control for the motor generator 13 in step S32, the energization control unit 41 may cause the process to proceed to step S33, and set the threshold Nx again on the basis of the vehicle acceleration. Thereafter, the energization control unit 41 may cause the process to proceed to step S34, and determine whether the motor speed Nm is equal to or less than the threshold Nx. If the motor speed Nm is determined to be greater than the threshold Nx in step S34 (step S34: N), the energization control unit 41 may cause the process to return to step S32, and continue the field weakening control for the motor generator 13. If the motor speed Nm is determined to be equal to or less than the threshold Nx in step S34 (step S34: Y), the energization control unit 41 may cause the process to proceed to step S35, and stop the field weakening control for the motor generator 13. Thereafter, the energization control unit 41 may repeat the third bearing protection control from step S30 again. In this manner, in the third bearing protection control, the threshold Nx may be set on the basis of the vehicle acceleration, and the field weakening control may be executed in a region where the motor speed Nm is greater than the threshold Nx.

Here, as illustrated in FIG. 12, as the motor speed Nm increases, induced voltage increases, causing the shaft voltage Va3 to increase. Moreover, as indicated by characteristic lines Lb1 to Lb3 in FIG. 12, even at the same motor speed Nm, the lubricant film F becomes thinner and the bearing withstand voltage Vb3 decreases in a case where the vehicle acceleration increases, whereas the lubricant film F becomes thicker and the bearing withstand voltage Vb3 increases in a case where the vehicle acceleration decreases. In other words, with reference to a situation in which the bearing withstand voltage Vb3 increases or decreases along the characteristic line Lb1, the bearing withstand voltage Vb3 increases or decreases along the characteristic line Lb2 in a case where the vehicle acceleration is increased, whereas the bearing withstand voltage Vb3 increases or decreases along the characteristic line Lb3 in a case where the vehicle acceleration is reduced.

As illustrated in FIG. 1, the motor generator 13 may be incorporated longitudinally in the power train 14. In other words, an axial direction S of the rotor shaft 32 of the motor generator 13 may be disposed along the longitudinal direction of the vehicle 11. Therefore, in a case where the vehicle acceleration increases, axial load that acts on the rotor 20 and the rotor shaft 32 toward a rear side of the vehicle may increase, as indicated by an arrow Ax1 in FIG. 2. This axial load may cause the outer race 33o and the inner race 33i of the bearing 33 and the outer race 34o and the inner race 34i of the bearing 34 to relatively move in the axial direction, causing gaps between the outer race 33o and the rolling element 33r, between the outer race 34o and the rolling element 34r, between the inner race 33i and the rolling element 33r, and between the inner race 34i and the rolling element 34r to decrease locally. In other words, the axial load may make the lubricant film F in the bearings 33 and 34 thinner. It is therefore presumable that the axial load increases and the bearing withstand voltage Vb decreases in a case where the vehicle acceleration increases.

Therefore, in the example illustrated in FIG. 12, in a situation in which the bearing withstand voltage Vb3 increases or decreases along the characteristic line Lb1, if the motor speed Nm exceeds a predetermined value Nb1, the shaft voltage Va3 enters the electrolytic corrosion occurrence region α above the bearing withstand voltage Vb3, which can cause electrolytic corrosion in the bearings 33 and 34. In a situation in which the bearing withstand voltage Vb3 increases or decreases along the characteristic line Lb2, if the motor speed Nm exceeds a predetermined value Nb2 on a lower speed side than "Nb1", the shaft voltage Va3 enters the electrolytic corrosion occurrence region α above the bearing withstand voltage Vb3, which can cause electrolytic corrosion in the bearings 33 and 34. In other words, in a case where the vehicle acceleration increases, the shaft voltage enters the electrolytic corrosion occurrence region α at a lower motor speed Nm than in a case where the vehicle acceleration decreases.

Hence, in the above-described third bearing protection control, the threshold Nx may be set lower as the vehicle acceleration increases. In other words, in a case where the vehicle acceleration increases, the threshold Nx may be set to be reduced from "Nx3" to "Nx4", as indicated by an arrow γ in FIG. 12. Thus, in a case where the vehicle acceleration increases, it is possible to execute the field weakening control at earlier timing. This makes it possible to suppress an increase in the shaft voltage Va3 to prevent the shaft voltage Va3 from exceeding the bearing withstand voltage Vb3, as indicated by dashed lines Xc and Xd in FIG. 12. In other words, it is possible to make the shaft voltage Va3 lower than the bearing withstand voltage Vb3, making it possible to prevent occurrence of electrolytic corrosion in the bearings 33 and 34. This helps to appropriately protect the bearings 33 and 34 and enhance durability of the motor generator 13.

In the above description, the threshold Nx to be compared with the motor speed Nm for determination may be set on the basis of the vehicle acceleration that acts when the vehicle is accelerated, i.e., the vehicle acceleration that acts toward the rear side of the vehicle, but this is a non-limiting example. For example, the threshold Nx to be compared with the motor speed Nm for determination may be set on the basis of vehicle deceleration that acts when the vehicle is decelerated, i.e., vehicle acceleration on a negative side that acts toward a front side of the vehicle. In this case, the threshold Nx may be set lower as the vehicle deceleration increases. It is to be noted that, also in a case of setting the threshold Nx on the basis of the vehicle deceleration, the threshold Nx may be changed in a continuous manner depending on the vehicle deceleration, as illustrated in FIG. 11A, or the threshold Nx may be changed in a stepwise manner depending on the vehicle deceleration, as illustrated in FIG. 11B.

Thus making the threshold Nx lower as the vehicle deceleration increases makes it possible to execute the field weakening control at earlier timing in a case where the vehicle deceleration increases. This helps to prevent occurrence of electrolytic corrosion in the bearings 33 and 34 and appropriately protect the bearings 33 and 34, as in the above-described third bearing protection control. In a case where the vehicle deceleration increases, axial load that acts on the rotor 20 and the rotor shaft 32 toward the front side of the vehicle may increase, as indicated by an arrow Ax2 in FIG. 2. As in the case of the vehicle acceleration, this axial load may cause the gaps between the outer race 33o and the rolling element 33r, between the outer race 34o and the rolling element 34r, between the inner race 33i and the rolling element 33r, and between the inner race 34i and the rolling element 34r to decrease locally. It is to be noted that the vehicle acceleration or the vehicle deceleration to be used to set the threshold Nx may be acceleration detected by the acceleration sensor 46, or acceleration or deceleration obtained by calculation from the vehicle speed.

The technology is not limited to the example embodiments described above. Various kinds of modifications or variations may be made without departing from the scope of the technology. In the example described for the second or third bearing protection control, the threshold Nx may be set on the basis of any one of the motor torque, the vehicle acceleration, and the vehicle deceleration, but this is a non-limiting example. The threshold Nx may be set on the basis of any two or more of the motor torque, the vehicle acceleration, and the vehicle deceleration. For example, the threshold Nx may be set on the basis of the motor torque and the vehicle acceleration, or the threshold Nx may be set on the basis of the motor torque and the vehicle deceleration. Alternatively, the threshold Nx may be set on the basis of the vehicle acceleration and the vehicle deceleration, or the threshold Nx may be set on the basis of the motor torque, the vehicle acceleration, and the vehicle deceleration.

Moreover, in the above description, the motor generator 13 may be incorporated longitudinally with respect to the power train 14, but this is a non-limiting example. The motor generator may be incorporated laterally with respect to the power train. Even in a case where the rotor shaft of the motor generator is thus disposed in a vehicle width direction, if the rotor shaft 32 is provided with a helical gear, for example, axial load may be inputted to the rotor shaft 32 when the vehicle is accelerated or when the vehicle is decelerated. Accordingly, it is possible to effectively apply the above-described third bearing protection control, for example. It is to be noted that the power train 14 to be installed in the vehicle 11 is not limited to the power train illustrated as an example in FIG. 1, and may be a power train in another form.

Comparative Example

Magnetic flux variation in the circumferential direction occurs in a stator of an electric motor, which causes a potential difference between the stator and a rotor in a direction of canceling out this magnetic flux variation. Moreover, an outer race of a bearing is in contact with the stator via a housing, and an inner race of the bearing is in contact with the rotor via a rotating shaft. This causes a potential difference between the outer race and the inner race of the bearing. If the potential difference between the outer race and the inner race exceeds a breakdown voltage of a lubricant film that is formed in the bearing, electrolytic corrosion can occur in the bearing. Such electrolytic corrosion may cause damage to the bearing. It is therefore demanded that electrolytic corrosion of the bearing be prevented.

It is desirable to provide a motor device that makes it possible to prevent electrolytic corrosion of a bearing.

According to the example embodiment described above, the energization control unit 41 executes field weakening control in a case where a rotational speed of the rotor 20 is greater than a threshold, and makes a potential difference between a housing (the motor housing 30) and a rotating shaft (the rotor shaft 32) lower than a withstand voltage of the bearings 33 and 34. This makes it possible to prevent electrolytic corrosion of the bearings 33 and 34.

The energization control unit 41 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the energization control unit 41. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and an SRAM, and the nonvolatile memory may include a ROM and an NVRAM. The ASIC is an integrated circuit (IC) customized to perform, and the FPGA is an integrated circuit designed to be configured after manufacturing in order to perform, all or a part of the functions of the energization control unit 41 illustrated in FIG. 1.

The invention claimed is:

1. A motor device to be installed in a vehicle, the motor device comprising:
   a stator accommodated inside a housing and including a concentrated winding coil;
   a rotor accommodated in a middle of the stator and including a permanent magnet;
   a bearing attached to the housing and supporting a rotating shaft of the rotor, the bearing including a lubricant film;
   an inverter provided between the stator and a power storage unit; and
   a controller configured to, in a case where a rotational speed of the rotor is greater than a threshold, execute field weakening control to maintain a potential difference between the housing and the rotating shaft to be lower than a breakdown voltage of the lubricant film of the bearing,
   wherein the breakdown voltage of the lubricant film corresponds to a voltage value that breaks down the lubricant film and interrupts an insulated state of the bearing,
   wherein the threshold decreases as acceleration of the vehicle increases, and
   wherein during the field weakening control, the controller controls, using the inverter, an energization state of the concentrated winding coil and generates magnetic flux of the concentrated winding coil in a direction of weakening magnetic flux of the permanent magnet.

2. The motor device according to claim 1, wherein the threshold decreases as motor torque increases.

3. The motor device according to claim 2, wherein the rotating shaft has an axial direction that is a longitudinal direction of the vehicle.

4. The motor device according to claim 2, wherein the threshold decreases as deceleration of the vehicle increases.

5. The motor device according to claim 4, wherein the rotating shaft has an axial direction that is a longitudinal direction of the vehicle.

6. The motor device according to claim 1, wherein the threshold decreases as deceleration of the vehicle increases.

7. The motor device according to claim 6, wherein the rotating shaft has an axial direction that is a longitudinal direction of the vehicle.

8. The motor device according to claim 1, wherein the rotating shaft has an axial direction that is a longitudinal direction of the vehicle.

9. The motor device according to claim 1, wherein a thickness of the lubricant film decreases as acceleration of the vehicle increases.

10. The motor device according to claim 1, wherein a thickness of the lubricant film increases as acceleration of the vehicle decreases.

* * * * *